United States Patent
Hesse

(10) Patent No.: US 6,644,887 B2
(45) Date of Patent: Nov. 11, 2003

(54) DEVICE FOR CONNECTING A TOWED PIPE TO A TOWING APPARATUS

(75) Inventor: Alfons Hesse, Lennestadt (DE)

(73) Assignee: Tracto-Technik Paul Schmidt Spezialmaschinen, Lennestadt (DE)

( * ) Notice: Subject to any disclaimer, the term of this patent is extended or adjusted under 35 U.S.C. 154(b) by 0 days.

(21) Appl. No.: 09/771,037

(22) Filed: Jan. 26, 2001

(65) Prior Publication Data

US 2001/0009633 A1 Jul. 26, 2001

Related U.S. Application Data

(62) Division of application No. 09/183,155, filed on Oct. 30, 1998, now abandoned.

(30) Foreign Application Priority Data

Nov. 6, 1997 (DE) .......................... 197 49 007

(51) Int. Cl.⁷ ................................. F16L 37/14
(52) U.S. Cl. .................. 403/341; 403/6; 403/294; 403/355; 285/305; 285/321
(58) Field of Search .................. 403/6, 341, 294, 403/355, 318; 285/321, 305

(56) References Cited

U.S. PATENT DOCUMENTS

| | | | | |
|---|---|---|---|---|
| 2,397,561 A | | 4/1946 | Petsche ....................... 279/51 |
| 3,422,630 A | * | 1/1969 | Marier ....................... 403/355 |
| 3,606,402 A | * | 9/1971 | Medney ....................... 285/305 |
| 3,759,553 A | * | 9/1973 | Carter ....................... 285/260 |
| 3,767,234 A | * | 10/1973 | Weirich et al. ............. 285/305 |
| 4,111,464 A | * | 9/1978 | Asano et al. ................ 285/423 |
| 4,269,436 A | * | 5/1981 | Medney ....................... 285/179 |
| 4,275,907 A | | 6/1981 | Hunt ............................ 285/18 |
| 4,293,148 A | * | 10/1981 | Milberger ................... 285/305 |
| 4,427,221 A | * | 1/1984 | Shay, Jr. ..................... 175/340 |
| 4,679,825 A | * | 7/1987 | Taylor ......................... 285/305 |
| 4,697,947 A | * | 10/1987 | Bauer et al. ................. 285/305 |
| 4,720,211 A | | 1/1988 | Streatfiled et al. ....... 405/184.5 |
| 4,848,953 A | | 7/1989 | Young ......................... 403/290 |
| 4,875,711 A | | 10/1989 | Watanabe ..................... 285/45 |
| 4,927,192 A | * | 5/1990 | Ungchusri et al. .......... 285/305 |
| 5,015,014 A | | 5/1991 | Sweeney ...................... 285/81 |
| 5,029,904 A | | 7/1991 | Hunt ........................... 285/24 |
| 5,255,945 A | * | 10/1993 | Toon ........................... 285/305 |
| 5,360,242 A | | 11/1994 | Argent ........................ 285/330 |
| 5,474,403 A | | 12/1995 | Hetrich ....................... 403/369 |
| 5,509,699 A | * | 4/1996 | Himmelberger ............ 285/321 |
| 5,813,705 A | * | 9/1998 | Dole ........................... 285/305 |
| 5,868,443 A | * | 2/1999 | Ungerman et al. .......... 285/305 |
| 5,964,297 A | | 10/1999 | Deman ......................... 166/380 |
| 5,984,582 A | | 11/1999 | Schwert ...................... 405/184 |
| 6,010,162 A | | 1/2000 | Grau et al. .................. 285/257 |

FOREIGN PATENT DOCUMENTS

| | | | | |
|---|---|---|---|---|
| CH | 684 546 | 10/1994 | | |
| DE | 2747541 | 4/1979 | | |
| DE | 197 18 790 | 11/1998 | | |
| EP | 0 086 567 | 8/1983 | | |
| EP | 441686 A1 | * | 8/1991 | ........... F16L/37/00 |
| EP | 493645 A1 | * | 7/1992 | ........... E21B/7/28 |
| EP | 0 496 981 | 8/1992 | | |
| GB | 2 090 931 | 7/1982 | | |

* cited by examiner

Primary Examiner—Lynne H. Browne
Assistant Examiner—Ernesto Garcia
(74) Attorney, Agent, or Firm—Merchant & Gould P.C.

(57) ABSTRACT

A device for connecting a towed pipe to a towing apparatus, for example a percussion boring machine or a towing head, comprises an adapter sleeve adapted to the towing apparatus and a towed pipe of which the connecting end is, for example, provided with longitudinal slits and accordingly can be changed in diameter, and locking means by which the adapter sleeve and the towed pipe can be connected together in a sufficiently tension-resistant manner.

8 Claims, 8 Drawing Sheets

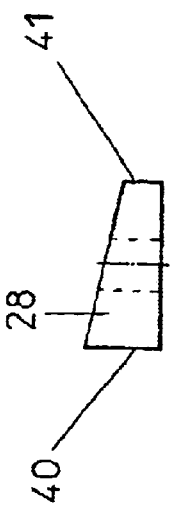
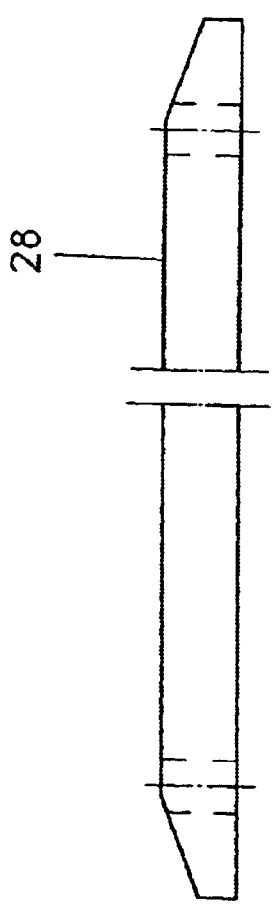
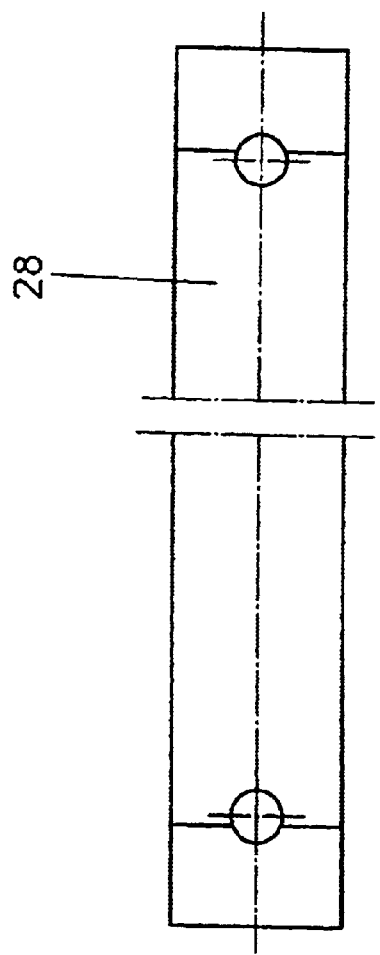
Fig.6

DEVICE FOR CONNECTING A TOWED PIPE TO A TOWING APPARATUS

This application is a divisional of application Ser. No. 09/183,155, filed Oct. 30, 1998 ABN, which application(s) are incorporated herein by reference.

FIELD OF THE INVENTION

The invention relates to a device for connecting a towed pipe or pipe string to a towing apparatus, for example a percussion boring machine or a towing head, by means of which the towed pipe can be drawn into the ground or into a pre-formed pilot bore in the ground.

BACKGROUND AND PRIOR ART

In the trenchless laying of pipelines by means of a percussion boring machine and in expanding a pilot bore by means of a towing, displacing, bursting or excavating head the object is to draw in a new product pipe simultaneously with the formation of the bore in the ground or the expansion of a pilot bore. The same applies to the destructive replacement of underground pipelines in which an old pipe is destroyed, for example by means of the chisel head of a percussion boring machine, and the fragments are forced laterally into the ground in order to increase the free cross-section of the underground pipeline so that a towed pipe having a diameter the same as or even larger than that of the old pipe can be drawn in with as little friction as possible at its outer wall.

Usually the new pipe is connected directly to the apparatus which is forming or expanding the bore in the ground, in order to prevent collapse of the bore in the region between the towing apparatus and the new pipe. This is mostly done by means of snap or screw connections.

However, in all methods the towed pipe is subjected to high frictional forces, depending on its length and the nature of the wall of the bore, which are still considerable even if a lubricating suspension, for example a bentonite-water suspension, is used when drawing in the new pipe. Further loadings on the new pipe occur in the case of dynamic drawing in using a percussion boring machine of which the ramming blows can act undamped on the towed or new pipe.

The loads described above make high demands on the connection between the towing apparatus and the new pipe, which usually consists of plastics material, for example HDPE.

While a number of pipe connections are known, these cannot cope with the high loads when pipe lengths of over 100 m and pipe diameters of, for example, 100 to 900 mm, are being drawn into the ground.

Thus European patent specification 0 086 567 discloses a pipe connection for use with a percussion boring machine in the destructive replacement of underground pipelines by means of a conical expander head. This pipe connection serves to connect the new pipe, which in provided with an internal screw thread, to a jacket pipe which is spaced from and surrounds the percussion boring machine and also has an internal screw thread. This is done by means of two intermediate pieces each provided with a screw thread at each end, and requires time-consuming screwing together of the four parts which are to be connected.

However, in the case of pipes of plastics materials problems already arise from the fact that the plastics materials in question have a high coefficient of thermal expansion. The resulting thermal expansions make screwing difficult, depending on the outside temperature.

Further, Swiss patent specification 684 546 describes a pipe connection in which the front pipe end has a smaller diameter and is provided there with an annular groove for a sealing ring. This pipe end engages in the rear end of the leading pipe, the sealing ring snapping into an internal annular groove and thereby wedging the two pipes together. However, since the sealing ring consists of a relatively soft material, this pipe connection can only transmit small tensile forces. Nevertheless the connection is so firm that it is difficult to release it in a—usually narrow—trench or in a narrow shaft.

Again, pipe connections are known from British application 2 090 931 and U.S. Pat. No. 5,360,242 in which at least one internal locking rib at the connecting end of a neighbouring pipe engages behind at least one external shoulder at the connecting end of a pipe, and the connecting end leaving the locking rib is clamped between the external shoulder and a further shoulder on the connecting end itself. This gives rise to considerable difficulties in forming the pipe connection owing to the thermal expansion of the plastics materials which come into question for such pipes.

OBJECT OF THE INVENTION

Starting from this state of the art, the object of the invention is to provide a less expensive but stable connection by which a towed pipe can be fastened to a towing apparatus and which in particular is able to transmit high tensile forces even in the case of dynamic boring or expanding of a pilot bore.

SUMMARY OF THE INVENTION

To this end, the invention comprises a device having an adapter sleeve for the transition from the towing apparatus to the towed pipe and a towed pipe of which the connecting end is locked to the adapter sleeve. The locking brings the adapter sleeve and the towed pipe into a secure but preferably releasable connection.

More particularly, the connecting end of the towed or new pipe can be provided with at least one groove and the adapter sleeve with at least one complementary rib, or vice versa. The preferably more than one ribs engage in the grooves and are locked there in such a way that the connection is able to meet all the demands of the heavy-duty operation of drawing in pipes.

The locking is preferably effected by means of a locking sleeve which supports the connection of the adapter and the towed pipe in the radial direction on the inside or outside.

Another means of connection in accordance with the invention comprises providing the connecting end and the adapter sleeve with opposed grooves into which preferably releasable locking bars can be pushed, by means of which the adapter sleeve and the towed pipe are locked together. The locking bars can have an insertion bevel and/or a pulling eye in order to facilitate their introduction into the grooves and their removal therefrom. The bars can also have a larger bearing area in the direction of advance than in the opposite direction. To stabilise this kind of connection a supporting sleeve may be provided in the connecting end of the towed pipe, between which and the adapter sleeve the front end of the pipe is then clamped.

The supporting sleeve preferably has a collar which engages between the front end of the towed pipe and a complementary internal shoulder of the adapter sleeve. The external diameter of the pipe in the adapter sleeve is preferably the same as the external diameter of the pipe to be drawn in. The locking bar or bars consist of an elastic material and preferably have a rectangular or square cross-section.

The towed pipe can be connected to the connecting pipe through a electric welding sleeve. Such a sleeve is described in the German Offenlegungsschrift 197 18 790, the contents of which are to be regarded as forming part of the present description. Generally butt welding is also suitable for connecting the pipes or pipe sections.

BRIEF DESCRIPTION OF THE DRAWINGS

The invention will now be described in more detail, by way of example, with reference to some embodiments shown in the drawings, in which:

FIG. 6 is a section of a locking bar showing bearing faces.

DETAILED DESCRIPTION OF PREFERRED EMBODIMENTS OF THE INVENTION

Figure 1:
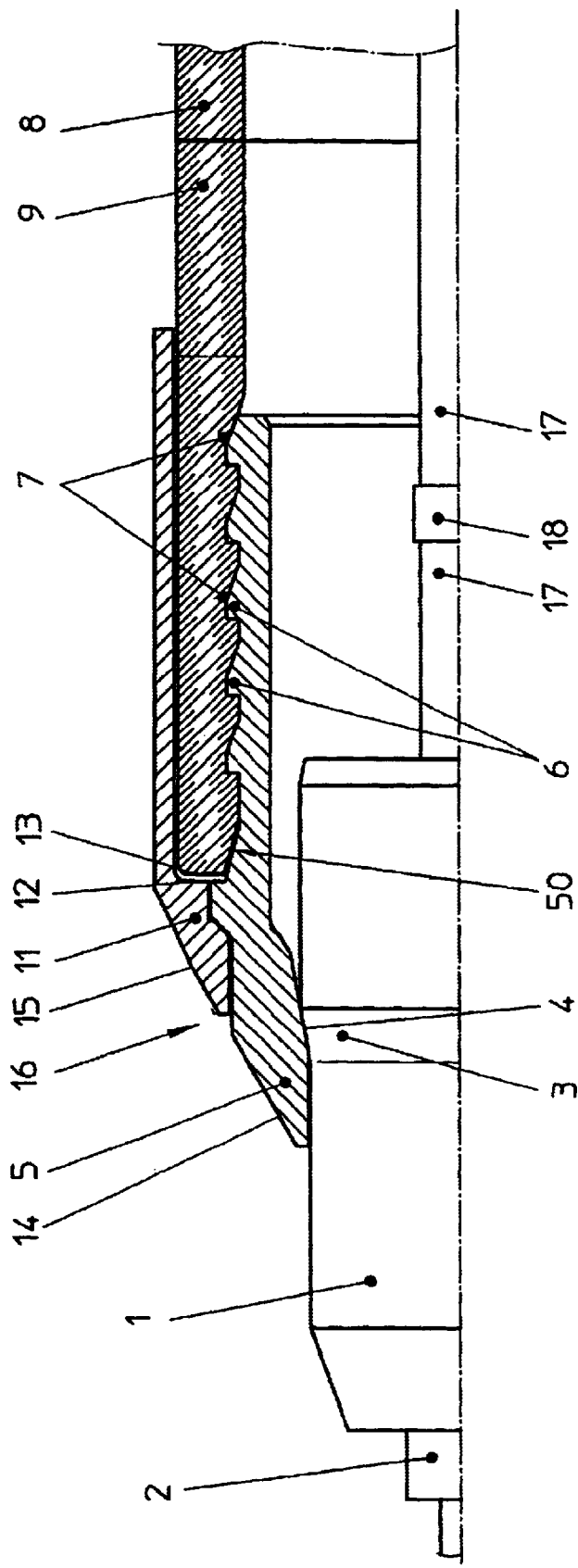
FIG. 1 shows a percussion boring machine with a connection to the towed pipe which includes a locking sleeve.

The percussion boring machine 1 includes at its forward end attachment means 2 for a towing cable and at its forward or—as shown—at its rear end a conical shoulder 3 against which a complementary internal face 4 of an adapter sleeve 5 fits closely. The adapter sleeve 5 has external teeth in the form of ribs 6 of saw-tooth cross-section, which engage in correspondingly shaped grooves 7 of the internal teeth of a towed pipe 8 in the form of a pipe string made up of individual pipes welded together. This engagement can be simply formed since the connecting end 9 of the towed pipe 8 is provided with elongated slits 10 running in the longitudinal direction (FIG. 2). In this way when the front pipe end 9 is pushed on over the saw-tooth ribs 6 of the adapter sleeve 5 the strips of the pipe wall between each two slits 10 bend slightly outwards. In the position shown in FIG. 1 the front end (connection end) of the towed pipe again assumes its original diameter; it is locked to the adapter sleeve 5 by the use of a locking sleeve 11, the internal diameter of which is slightly larger than the external diameter of the towed pipe. This is done by pushing the locking sleeve 11 on to the adapter sleeve from the forward end until its internal collar 12 meets the front face 13 of the towed pipe.

The conical faces 14, 15 of the two sleeves 5, 11 combine to form a cone 16, by means of which the ground surrounding the percussion boring machine 1 is expanded so that the towed pipe 8 can be drawn into the ground without excessive friction at its surface. This is ensured by the larger external diameter of the locking sleeve 11 compared with the external diameter of the towed or new pipe 8, which creates the necessary free space for drawing in the pipe 8.

The percussion boring machine 1 is supplied in the usual way through a hose line 17 with compressed air or another driving medium. In the hose there is a shock valve 18. By means of a towing cable engaging the fitting 2 the machine can be pulled through the pipe 8 into the adapter sleeve 5 as far as the position shown in FIG. 1.

The connecting end 9 of the pipe 8 can also be provided with circumferential external grooves 19 of rectangular cross-section, which have complementary internal grooves 20 of an adapter sleeve 21 lying opposite them, the connecting end 9 of the towed pipe 8 comprises an electric welding sleeve 50. The adapter sleeve 21 has an internal shoulder 22 having a face running at an angle to the pipe axis and so inclined that a supporting sleeve 25 can be inserted between the front face 23 of the pipe 8 and the shoulder 22 of the collar 24.

The adapter sleeve 21 has a larger diameter than the pipe string 8, in order to keep the pipe wall friction low and like the adapter sleeve 5—an internal or inclined face 4 which is in close contact with the conical shoulder 3 of the percussion boring machine 1. Further, the adapter sleeve is conically shaped in the direction of advance and is fitted with blades 26 parallel to the axis for destroying an old underground pipe. The adapter sleeve is further provided with an insertion bevel 30 and the connecting end 9 with an insertion cone 31 to facilitate the threading of the connecting end into the adapter sleeve. In addition it is provided with a sealing ring 32 which prevents penetration of dirt or drilling liquid into the interior of the pipe.

In forming the connection the connecting end 9 of the pipe string 8 is first inserted into the adapter sleeve 21 together with the already positioned supporting sleeve 25 until the collar 24 lies between the front face 23 of the pipe and the shoulder 22 of the adapter sleeve 21. In many cases, particularly when the pipes to be drawn in are thick-walled or are sufficiently resistant to bending, the supporting sleeve 25 can be omitted. In some cases it can also be appropriate for the connecting pipe to have thicker walls than the towed pipe. In this situation the annular grooves 19, 20 on the two sides in the connecting end 9 and the adapter sleeve 21 are aligned with one another, so that in each case they form a closed annular passage with a square cross-section. Flexible locking bars 28, for example of steel or plastics material, are then pushed into the two annular passages through respective passages 29 leading to the outer face of the adapter sleeve. The flexibility of the locking bars 28 should be just adequate to allow them to bend to follow the course of the annular passages. The locking bars then have a sufficiently high resistance to deformation to lock the connecting end 9 and the adapter sleeve 21 securely together even under very high tensile forces. Preferably, the openings for inserting the locking bars 28 are closed by caps.

Figure 4:
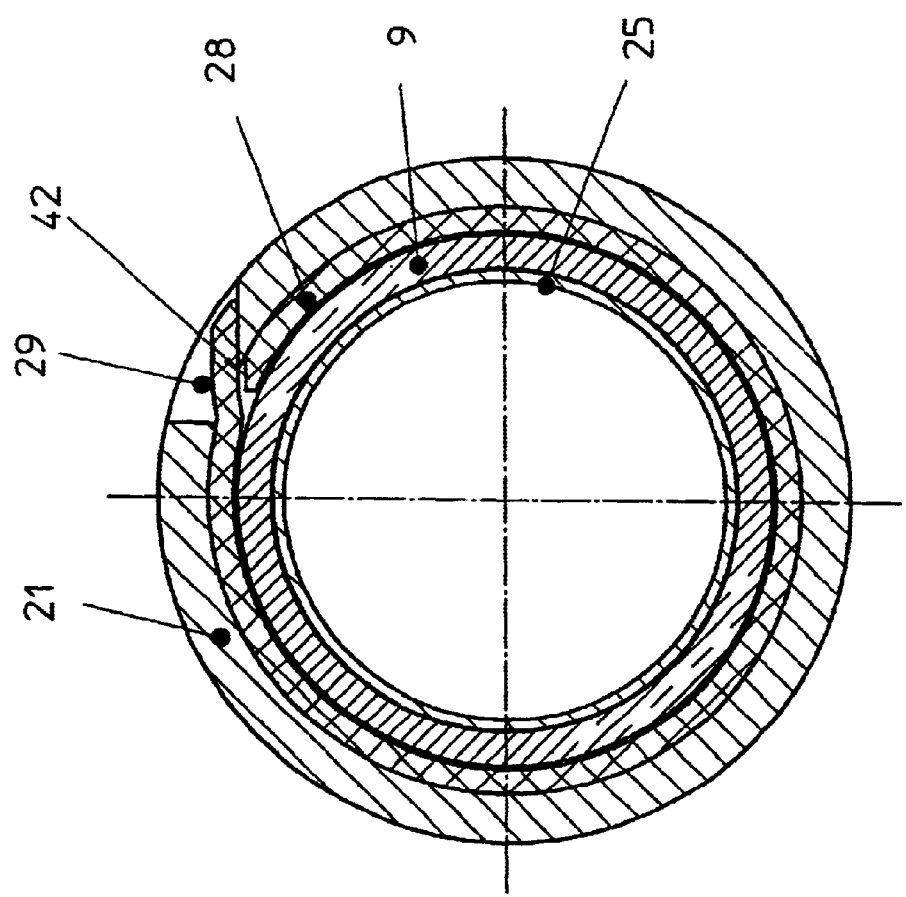
FIG. 4 is a section along the line VI—VI in FIG. 3, showing an embodiment with an insertion bevel.

As illustrated in FIG. 4, the locking bars 28 may have an insertion bevel 42.

Figure 7:
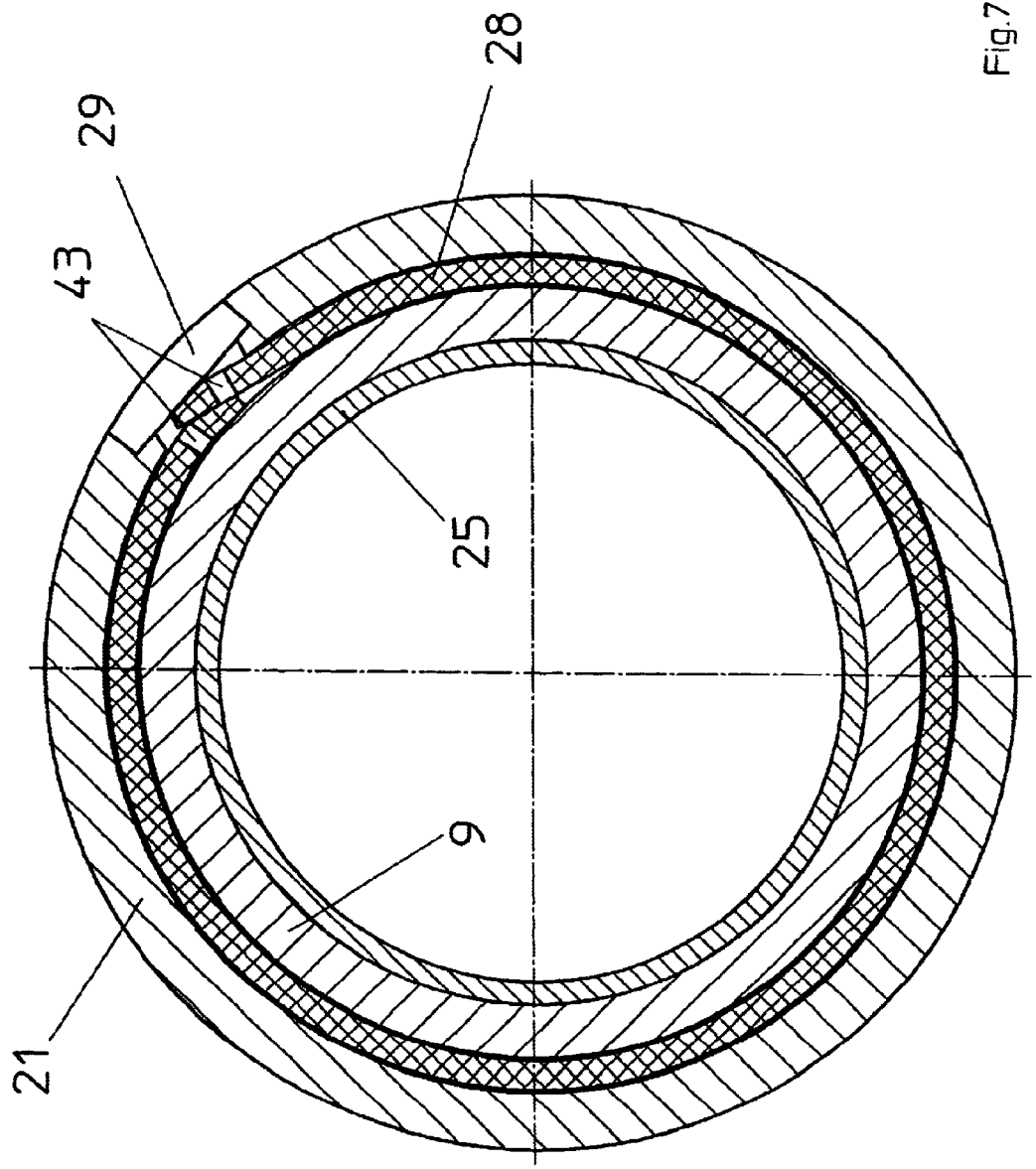
FIG. 7 is a section along the line VI—VI in FIG. 3, showing an alternative embodiment with a pulling eye.

As illustrated in FIG. 7, the locking bars 28 may have a pulling eye 43.

It is noted that the locking bar 28 as shown in FIG. 7 is positioned to show the pulling eyes 43 clearly. However, although the area of the locking bars 28 comprising the insertion bevel 42 as shown in FIG. 4 is partially obscured in FIG. 7, it is emphasized that the presence of a pulling eye 43 does not exclude the presence of an insertion bevel. Thus, embodiments of the locking bars 28 may have both an insertion bevel 42 and a pulling eye 43.

As illustrated in FIG. 6, a bearing area 40 of the locking bars 28 in the direction of advance may be larger than a bearing area 41 of the locking bars 28 in the opposite direction.

Figure 3:
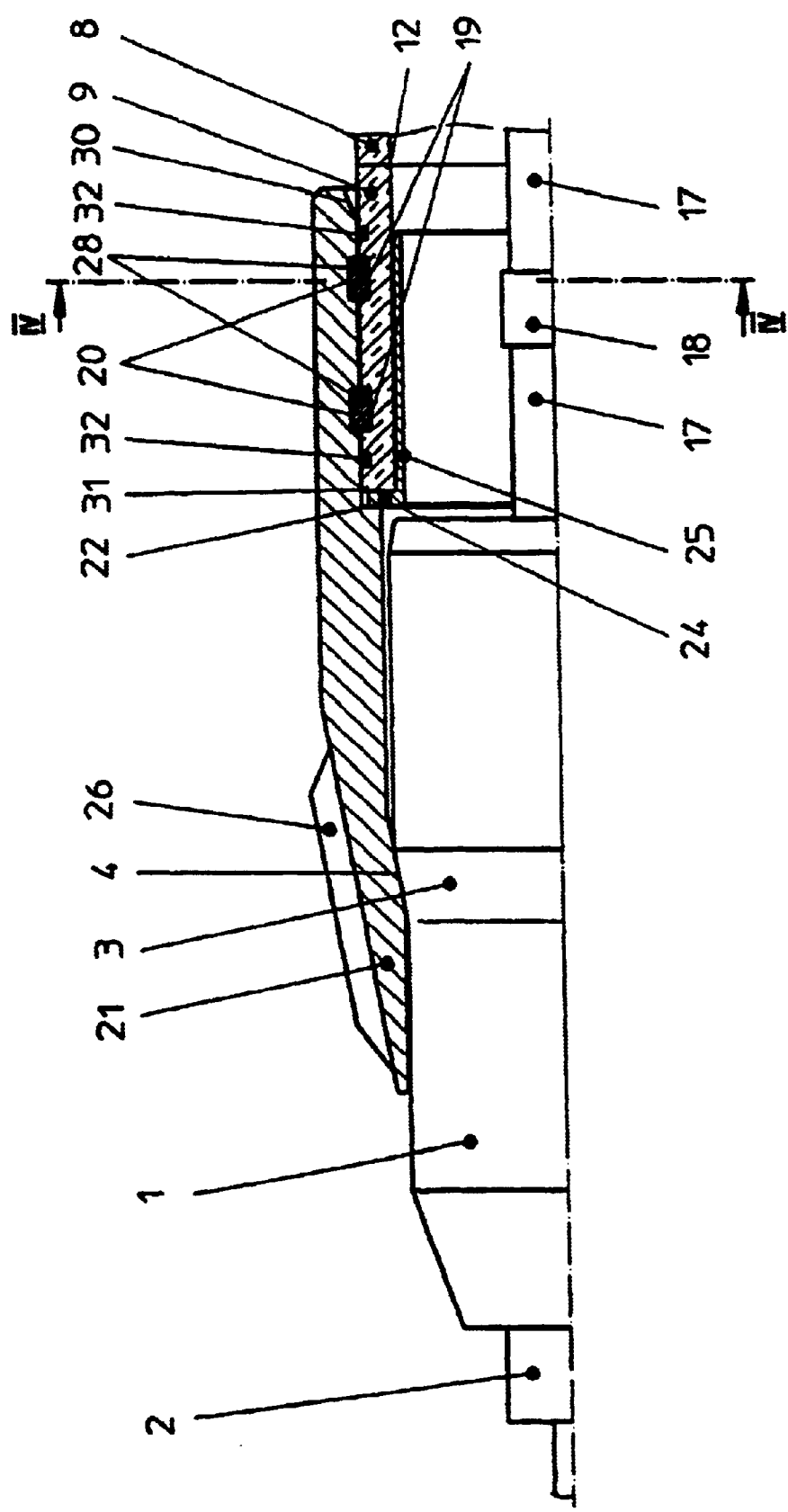
FIG. 3 shows a percussion boring machine with a connection to the towed pipe which includes locking bars.
Figure 5:
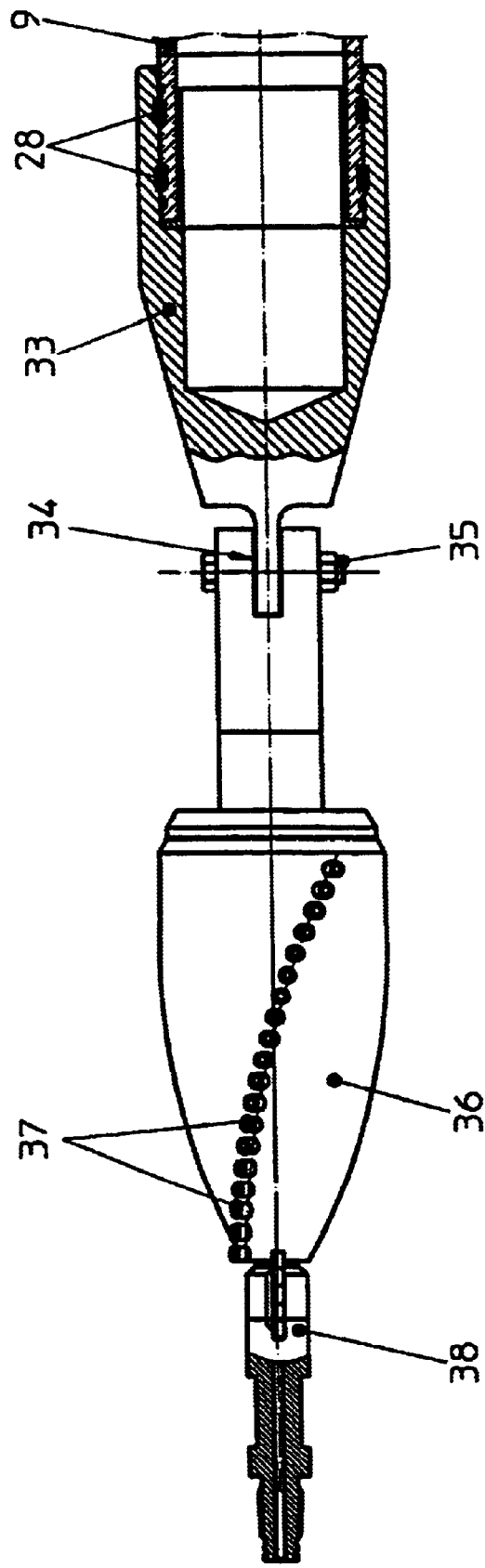
FIG. 5 is a towing apparatus in the form of a back reamer having a connection to the towed pipe.

In the case of the embodiment shown in FIG. 5 the connection end 9 of the towed pipe is connected in the way shown in FIGS. 3, 4 to an adapter sleeve 33 by means of two locking bars 28. The adapter sleeve is provided with a connecting eye 34 which is connected by means of a pin 35 to the rear end of a back reamer 36 which serves as an expanding tool. The back reamer is provided with excavating tools 37 and is rotatably mounted: it is caused to rotate by means of a rotary linkage 38 which engages its front end.

A particular advantage of the connections shown is that they are simple to form and can very easily be released again. For this purpose, in the connections shown in FIGS. 1 and 2 it is merely necessary to slide the locking sleeve 11 and then the adapter sleeve 5 forwards (to the left in FIG. 1), or in the case of the connection shown in FIGS. 3 to 5 to withdraw the two locking bars 28 from their annular passages 19, 20. No screwing operations are needed. Between the device of the invention and the expanding tool 36 a crevice can be provided which permits the passage opening to be rotated into the position desired for withdrawal of the locking bars 28.

The invention also makes it possible to re-use the connecting end, which only needs to be separated by means of a saw from the pipe string which has been laid in the ground; it can then be welded to a new pipe string. Consequently there is no need to provide the connecting end of each pipe string with teeth (FIG. 1) or with internal grooves (FIG. 3). It is particularly advantageous if the towing apparatus 1 is withdrawn through the towed pipe 8 after releasing the connection so that it can be removed from the starting location. This allows considerably smaller target pits to be provided, from which only the expanding tool 36 has to be removed.

Figure 2:
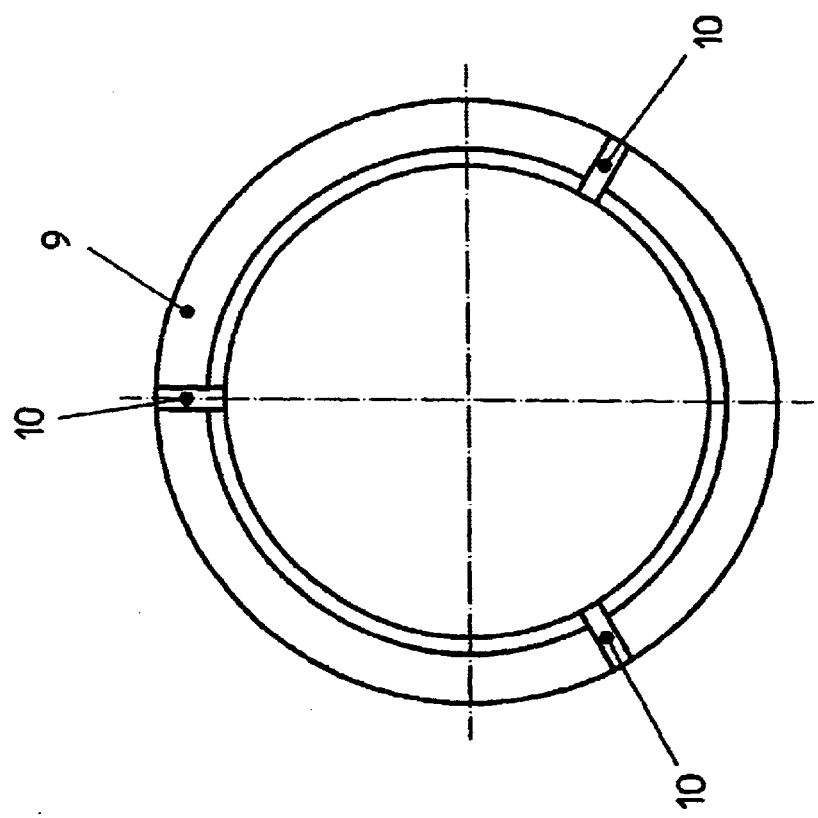
FIG. 2 is an end view of the towed pipe of FIG. 1.

The towed pipe 8 may include an electric welding sleeve 50 for connecting the towed pipe 8 to another pipe or pipe section, as shown in FIG. 1.

Figure 8:
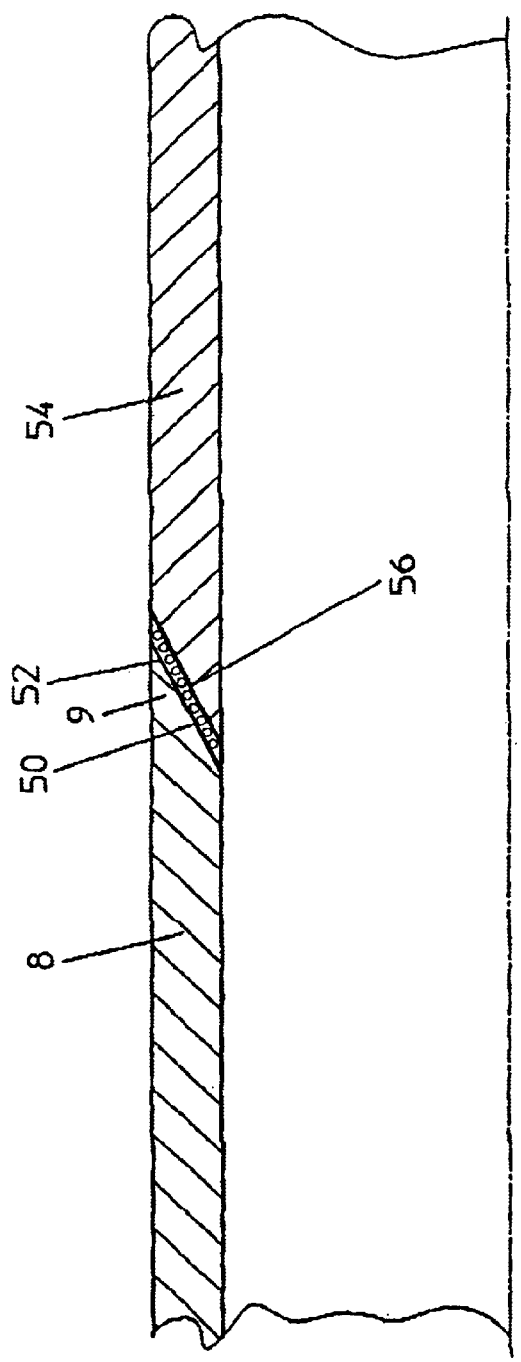

An arrangement for such a connection is shown in FIG. 8, along with another pipe 54 For purposes of clarity, both the pipe end 9 of the towed pipe 8 and the other pipe 54 are illustrated with simple, conical contact surfaces 52 and 56. As shown therein, the electric welding sleeve 50 is provided in the form of a coil on the pipe end 9, more particularly on the contact surface 52. The contact surface 56 of the other pipe 54 also is arranged in contact with the welding sleeve 50, so that the towed pipe 8 can be connected with the other pipe 54 via the electric welding sleeve 50.

Altogether, there is thus provided an economical connection, which is equally easily formed and released, and has a long life and the ability to transmit high tensile forces.

What is claimed is:

1. Device for connecting a towed pipe to a towing apparatus, comprising:
   an adapter sleeve;
   a towed pipe comprising a connecting end, wherein the connecting end defines grooves therein, and the adapter sleeve defines grooves therein opposed to the grooves in the connecting end;
   locking bars disposed in the grooves in the connecting end, each of the locking bars comprising an insertion bevel
   wherein:
      the locking bars comprise a pulling eye;
      the supporting sleeve comprises a collar and the adapter sleeve comprises a complementary internal shoulder;
      the supporting sleeve engages between a front end of the towed pipe and the complementary internal shoulder.

2. Device as claimed in claim 1, wherein the locking bars are elastic.

3. Device as claimed in claim 1, wherein the locking bars are releasable.

4. Device as claimed in claim 1, wherein a bearing area of the locking bars is larger in a direction of advance than a bearing area of the locking bars in a direction opposite the direction of advance.

5. Device as claimed in claim 1, further comprising a supporting sleeve located in the connecting end of the towed pipe.

6. Device as claimed in claim 1, wherein the adapter sleeve comprises an insertion bevel and the connecting end comprises an insertion cone.

7. Device as claimed in claim 1, wherein the connecting end of the towed pipe comprises an electric welding sleeve.

8. Device for connecting a towed pipe to a towing apparatus, comprising:
   an adapter sleeve;
   a towed pipe comprising a connecting end, wherein the connecting end defines grooves therein, and the adapter sleeve defines grooves therein opposed to the grooves in the connecting end; and
   locking bars disposed in the grooves in the connecting end, each of the locking bars comprising an insertion bevel;
   wherein the connecting end of the towed pipe defines longitudinal slits therein.

* * * * *